(12) United States Patent
Buras et al.

(10) Patent No.: US 7,544,239 B2
(45) Date of Patent: *Jun. 9, 2009

(54) REDUCTION OF SULFUR EMISSIONS FROM CRUDE FRACTIONS

(75) Inventors: Paul J. Buras, Lyons (FR); William D. Lee, Humble, TX (US); James R. Butler, League City, TX (US)

(73) Assignee: Fina Technology, Inc., Houston, TX (US)

( * ) Notice: Subject to any disclaimer, the term of this patent is extended or adjusted under 35 U.S.C. 154(b) by 403 days.

This patent is subject to a terminal disclaimer.

(21) Appl. No.: 11/250,665

(22) Filed: Oct. 14, 2005

(65) Prior Publication Data

US 2006/0116450 A1 Jun. 1, 2006

Related U.S. Application Data

(63) Continuation-in-part of application No. 11/001,361, filed on Dec. 1, 2004.

(51) Int. Cl.
*C08L 95/00* (2006.01)

(52) U.S. Cl. .............................. 106/284.3; 106/284.02; 524/68; 524/69; 524/70; 524/71

(58) Field of Classification Search ............ 106/284.02, 106/284.3; 524/68–71
See application file for complete search history.

(56) References Cited

U.S. PATENT DOCUMENTS

| | | | |
|---|---|---|---|
| 5,104,916 A * | 4/1992 | Trinh et al. | 524/71 |
| 5,611,910 A | 3/1997 | Marzari | |
| 6,180,697 B1 * | 1/2001 | Kelly et al. | 524/59 |
| 6,310,122 B1 * | 10/2001 | Butler et al. | 524/60 |
| 6,767,939 B2 * | 7/2004 | Butler et al. | 524/71 |
| 7,291,259 B2 * | 11/2007 | Gupta et al. | 208/299 |
| 2004/0074812 A1 | 4/2004 | Cullen | |
| 2005/0145137 A1 * | 7/2005 | Buras et al. | 106/284.3 |

OTHER PUBLICATIONS

Experimental results for asphalt samples from Bill Lee re. H2S level in treated asphalt.

* cited by examiner

*Primary Examiner*—Peter Szekely
(74) *Attorney, Agent, or Firm*—Tenley R. Krueger

(57) ABSTRACT

Methods of modifying crude fractions are described herein. The methods generally include blending a crude fraction with an emissions reducing additive to form a modified crude fraction, wherein the modified crude fraction exhibits reduced sulfur emissions. The emissions reducing additive generally includes a dispersion of a metal oxide.

17 Claims, No Drawings

REDUCTION OF SULFUR EMISSIONS FROM CRUDE FRACTIONS

CROSS-REFERENCE TO RELATED APPLICATIONS

This application is a continuation in part of co-pending U.S. patent application Ser. No. 11/001,361, filed on Dec. 1, 2004, which is incorporated by reference herein.

FIELD

Embodiments of the present invention generally relate to crude fractions, such as asphalt and heavy fuel oils, and methods of forming the same.

BACKGROUND

Unfortunately, processing of crude fractions may cause the release of byproducts, such as hydrocarbons, hydrogen sulfide, nitrogen oxide and carbon monoxide. These byproducts are formed in a number of ways. For example $H_2S$ may be formed as a result of sulfur additions used during crude fraction processing or as a result of sulfur present in the crude fraction being processed, such as sour crude fractions, for example.

Such byproducts are regulated by the Environmental Protection Agency and are subject to the best available control technology (BACT), such as incineration. However, incineration generally oxidizes heterosulfur organic compounds and hydrogen sulfide, generating oxides of sulfur ($SO_x$). Further, many countries, including the United States, have set standards and regulations to control the maximal permissible discharge level of pollutants, such as $SO_x$, to protect the environment.

Further, combustion of heavy fuel oils may generate $SO_x$ emissions through the combustion of hydrogen sulfide present in the heavy fuel oils. One method to reduce such emissions includes cleaning the effluent with expensive caustic scrubber equipment. Such scrubbers require extensive initial capital costs and significant annual operating costs. Further, such scrubbing processes generally result in undesirable byproducts, such as sodium and potassium sulfides, sulfites and sulfates, all of which require special handling for disposal.

In addition, sulfur may cause corrosion in pipelines, pumping and refining equipment, poisoning of catalysts used in the refining and combustion of fossil fuels and the premature failure of combustion engines. Sulfur further poisons the catalytic converters used in diesel-powered trucks and buses to control the emissions of oxides of nitrogen ($NO_x$.) Sulfur also causes an increase in particulate emissions from trucks and buses by degrading the soot traps used on these vehicles. Further, the burning of sulfur-containing fuel produces sulfur dioxide ($SO_2$), which enters the atmosphere as acid rain, inflicting harm on agriculture and wildlife and causes hazards to human health. Therefore, removal of sulfur from crude fractions may be desirable.

One method of crude fraction desulfurization is hydrodesulfurization, i.e., the reaction between the fossil fuel and hydrogen gas at elevated temperature and pressure in the presence of a catalyst. This causes the reduction of organic sulfur to gaseous $H_2S$, which is then oxidized to elemental sulfur. However, a large amount of unreacted $H_2S$ remains.

Therefore, a need exists for a method of reducing sulfur based emissions from crude fractions, such as asphalt and heavy fuel oil, without the need for intensive capital expenditure.

SUMMARY

An embodiment of the invention generally includes a method of modifying a crude fraction. The method generally includes blending a crude fraction with an emissions reducing additive to form a modified crude fraction, wherein the modified crude fraction exhibits reduced sulfur emissions. The emissions reducing additive generally includes a dispersion of a metal oxide.

Another embodiment generally includes a modified crude fraction. The modified crude fraction generally includes a crude fraction and a dispersion of a metal oxide.

DETAILED DESCRIPTION

Introduction and Definitions

A detailed description will now be provided. The appended claims define an invention, which for infringement purposes, is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims. Each of the inventions will now be described in greater detail below, including specific embodiments, versions and examples, but the inventions are not limited to these embodiments, versions or examples, which are included to enable a person having ordinary skill in the art to make and use the inventions, when the information in this patent is combined with available information and technology.

Various terms as used herein are shown below. To the extent a term used in a claim is not defined below, it should be given the broadest definition persons in the pertinent art have given that term as reflected in printed publications and issued patents. To the extent that ranges of values are used in the claims or description below, it should be understood that any upper limit, lower limit and or points that lie therein may be independently combined to define an embodiment of the invention.

As used herein, the term "crosslinking agent" refers to an additive used to introduce mechanical links and/or chemical bonds to a chemical compound.

"Sulfur" refers to elemental sulfur in any of its physical forms, including various compositions or organic compounds that generate sulfur under mixing or other preparation processes. For example, sulfur may include elemental sulfur in powder form (flowers of sulfur), mercaptobenzothiazole (MBT), dithiocarbamates, thiurams and combinations thereof.

The term "aggregate" means rock and similar material added to a bitumen composition to form a paving composition. For example, the aggregate may be granite, basalt, limestone or combinations thereof.

The term "asphalt" means any asphalt bottoms fraction, as well as naturally occurring asphalts, tars and pitches and may be used interchangeably herein with the term "bitumen." The term "asphaltic concrete" means asphalt used as a binder with appropriate aggregate added, typically for use as a paving material.

The term "diesel fuel" refers to that portion of crude oil that distills out after naphtha, and generally within the temperature range of from about 200° C. to about 370° C. Crude fractions and cracking products whose boiling ranges are contained in this range, as well as those that overlap with this range are included. Such crude fractions generally include fluid catalytic cracking (FCC) cycle oil fractions, coker distillate fractions, straight run diesel fractions and blends thereof.

The term "gas oils" refers to liquid petroleum distillates that have higher boiling points than naphtha. For example, the boiling range may be from about 250° C. to about 600° C. Such gas oils generally include FCC slurry oil, light and heavy gas oils and coker gas oils.

The term "crude fraction" refers to any of the various refinery products produced from crude oil, either by atmospheric distillation or vacuum distillation, including fractions that have been treated by hydrocracking, catalytic cracking, thermal cracking or coking and those that have been desulfurized.

The term "bottoms fraction" refers to a crude fraction having a flash point of about 70° F. or greater.

As used herein, the term "processing" is not limiting and includes agitating, mixing, milling, blending and combinations thereof, all of which are used interchangeably herein. The processing occurs in one or more vessels, such vessels being known to one skilled in the art.

Embodiments of the invention generally include modified crude fractions including the crude fraction and an emissions reducing additive. Such modified crude fractions are generally formed by blending the emissions reducing additive with the crude fraction. The crude fractions may include, for example, light straight-run naphtha, heavy straight-run naphtha, light stream-cracked naphtha, light thermally cracked naphtha, light catalytically cracked naphtha, heavy thermally cracked naphtha, reformed naphtha, alkylate naphtha, kerosene, hydrotreated kerosene, gasoline and light straight-run gasoline, straight-run diesel, atmospheric gas oil, light vacuum gas oil, heavy vacuum gas oil, residuum, vacuum residuum, asphaltenes, resins, deasphalted oils, light coker gasoline, coker distillate, FCC cycle oil and FCC slurry oil. In one embodiment, the crude fraction is a bottoms fraction, such as asphalt, diesel fuels, gas oils and/or fuel oils, for example.

The emissions reducing additive (ERA) generally includes a metal oxide. In one embodiment, the metal oxide is a transition metal oxide, such as zinc oxide, copper oxide, iron oxide, aluminum oxide or combinations thereof.

Metal oxides are generally supplied in particulate form, such as a powder or flakes. However, difficulty in solids handling may result in increased processing costs and complications. Therefore, in one embodiment, the ERA is dispersed in oil to form a dispersion (or in some embodiments, an emulsion) prior to blending the ERA with the crude fraction. Such dispersion may be formed in any manner known to one skilled in the art, such as suspending the ERA in a carrier of diluent liquid. In one embodiment, the diluent liquid includes oils having a flash point of 70° F. For example, the diluent liquid can include mineral oil or other commercially available oils, such as Sunpave 125, Hydrolene or light flux oil. In one embodiment, the diluent liquid includes oils having a flash point that is equal to or above the flash point of the crude fraction. For example, in asphalt applications, the diluent liquid may have a flash point of greater than about 400° F.. In such an embodiment, the dispersion may include from about 20 wt. % to about 60 wt. % ERA, or from about 25 wt. % to about 55 wt. %, or from about 30 wt. % to about 50 wt. %, or from about 35 wt. % to about 45 wt. % or from about 38 wt. % to about 42 wt. %. For example, the dispersion may include about 40 wt. % ERA.

The dispersion may then be blended with the crude fraction by methods known in the art to form the modified crude fraction. In one embodiment, the crude fraction includes from about 0.05 wt. % to about 2 wt. % dispersion, or from about 0.07 wt. % to about 1 wt. % or from about 0.09 wt. % to about 0.05 wt. %, or from about 0.1 wt. % to about 0.2 wt. % dispersion, for example.

Such incorporation of the dispersion may further include blending a surfactant with the modified crude fraction to stabilize the dispersion. Certain crude fractions contain surface active agents as naturally-occurring components of the fractions, and these agents may serve by themselves to stabilize the emulsion. In other cases, synthetic or non-naturally-occurring surfactants may be added. Surfactants are known in the art and a listing of applicable surfactants can be found in *McCutcheon's Volume I. Emulsifiers & Detergents*, 1999 North American Edition, McCutcheon's Division, MC Publishing Co., Glen Rock, N.J.

When utilized, the surfactant is added to the modified crude fraction in an amount sufficient to maintain the ERA substantially dispersed throughout the modified crude fraction. As used herein, the term "substantially dispersed" refers to a dispersion level sufficient to retain pumpability of the modified crude fraction. Such amount may vary depending on the choice of surfactant, ERA, crude fraction and/or desired operating results, for example.

Any portion of the processing may occur at temperatures known to one skilled in the art. For example, the blending may occur at a temperature of from about 150° C. to about 250° C., or from about 175° C. to about 225° C., for example. Additionally, such crude fraction may be submitted to additional treatment processes either before blending with the ERA or after, as known in the art.

Unexpectedly, the sulfur emissions may be reduced by at least 10%, or by at least 15% or by at least 20%. In one embodiment, the sulfur emissions are reduced by about 70% to about 100% in comparison to the levels in the same sample prior to treatment with the ERA, or from about 80% to about 95%. In another embodiment, the modified crude fraction exhibits a sulfur emissions level of less than about 10 ppm, or less than about 5 ppm or less than about 1 ppm when tested via the methods described in the Example below.

If additives, described in further detail below, are utilized, they may be incorporated into the crude fraction, at the same time as, prior to or after combination with the ERA. Such additives are known to one skilled in the art and will generally depend on the crude fraction being used, the use for the modified crude fraction and the processing conditions, for example.

In a specific embodiment, the crude fraction is asphalt. In such an embodiment, the asphalt is blended with the ERA to form a modified asphalt composition.

The asphalt may be any suitable petroleum asphalt or asphaltic residue. Asphalt products from refinery operations are well known in the art. For example, asphalts typically are obtained from deep vacuum distillation of crude oil to obtain a bottom product of a desired viscosity or from a solvent deasphalting process that yields a demetalized oil, a resin fraction and/or an asphaltene fraction. For example the asphalt can be formed from sweet or sour crude, heavy or light crude or aromatic or napthenic crude.

In refinery processes lacking a resin fraction, the asphaltene fraction or other compatible oils of greater than 450° F. flash point may be blended to obtain the desired viscosity asphalt. Alternatively, other asphaltic materials, such as coal tar pitch, rock asphalt and naturally occurring asphalt may be used.

The asphalt composition may further include additives in addition to the ERA, such as sulfonating agents and/or crosslinking agents.

The crosslinking agents may be activators (e.g., zinc oxide), accelerators, such as sulfur compounds (e.g., mercaptobenzothizole (MBT)) or both accelerators and activators, such as a zinc salt of MBT, for example. In one embodiment, the crosslinking agent is a metal oxide. Although the metal oxide may be the same or a different metal oxide than the ERA, such crosslinking metal oxide is added in addition to the metal oxide ERA, when used. In another embodiment, the crosslinking agent is a sulfur containing compound.

The additives can further include unsaturated functional monomers, unsaturated carboxylic acids, unsaturated dicarboxylic acids, unsaturated anhydrides, unsaturated esters and/or unsaturated amides, for example.

In one embodiment, the asphalt composition generally includes from 80 wt. % asphalt or more, or about 90 wt. % asphalt or more, or in one embodiment, about 95 wt. % asphalt or more.

In an alternative embodiment, the asphalt may further be blended with a polymer to form a polymer modified asphalt (PMA.) In addition to the reduction of sulfur emissions as described herein, embodiments of the invention may also reduce processing emissions, such as emissions created when blending crosslinking agents with a PMA. Typical asphalt compositions are generally emulsified to reduce the release of environmentally-harmful emissions. Emulsification generally requires that the asphalt and any desired performance-enhancing additives be combined with an emulsifying agent in an emulsification mill along with about 20 to 40 percent by weight of water. Polymer modified asphalts generally have high viscosities and melting points, making emulsification of the PMA difficult. Further, water emulsions may vaporize upon contact with hot asphalt causing difficulties. Therefore, it may be desirable to blend such compositions with the dispersions described herein. Such PMAs may be blended with any of the additives discussed above.

In another specific embodiment, the crude fraction is a heavy fuel oil. Fuel oils generally include bunker fuels and residual fuels. For example, No. 6 fuel oil (Bunker C) is used in oil-fired power plants as the major fuel and is also used as a main propulsion fuel in deep draft vessels in the shipping industry. No. 4 and No. 5 fuel oil are used to heat large buildings, such as schools, apartment buildings and office buildings, and large stationary marine engines. The heaviest fuel oil is the vacuum residuum from the fractional distillation having a boiling point of about 565° C. and above, generally used as an asphalt and/or coker feed.

The heavy fuel oil may further be blended with additives, such as lubrication enhancing compounds, anti-static agents, cold flow improvers, such as ethylene-unsaturated ester copolymers, hydrocarbon polymers, polar nitrogen compounds, alkylated aromatics, linear polymer compounds and comb polymers, detergents, corrosion inhibitors, dehazers, demulsifiers, metal deactivators, anti-foaming agents, combustion improvers, such as cetane improvers, co-solvents, compatibilizers, deodorants and metallic-based additives, such as metallic combustion improvers, for example.

It is contemplated that such modified fuel oils will generally experience a significant reduction in sulfur based emissions. For example, fuel oils may exhibit significant reductions in hydrogen sulfide, sulfur dioxide and mercaptans emissions.

EXAMPLES

General: Selected asphalt samples were treated and characterized by the following method. A flask (1.5 L with sidearm) was weighed; about 600 g. of the sample asphalt was transferred to the flask and again weighed to determine the weight of the sample in the flask. About 200 ml. of a 1N sodium hydroxide caustic solution was then added to a gas washing bottle, which was weighed in the same manner as the flask.

The flask (over a heating source with a magnetic stirring device) was then connected to the gas washing bottle via a Tygon tube in a vented fume hood. The gas washing bottle was placed over a water bath maintained at about 115° F. The flask was sealed with a stopper equipped with a thermometer and glass tubing connected through a flow meter (e.g., to ensure a constant nitrogen flow) to a nitrogen gas cylinder.

Nitrogen flow at a minimum rate of 50 ml/min. was started and the flask was heated to 350° F. over 30 minutes to 1 hour and then maintained at 350° F. for three hours. The flask was continually stirred over this time period. After 3 hours, the flask was removed from the heat and the gas washing bottle. The weight of the caustic solution was weighed and the solution was transferred to a clean glass bottle for subsequent $H_2S$ titration analysis.

Samples: Each of the samples listed below were removed from finished product tanks and tested for $H_2S$ via the methods described above.

| Sample # | Asphalt Type | ERA amount (wt. %) | Initial $H_2S$ level | $H_2S$ level upon testing |
|---|---|---|---|---|
| 1 | PG64-22 | ZnO (0.1) | Unknown | ND |
| 2 | 30-Pen | ZnO (0.1) | Unknown | ND |
| 3 | 120/150 Pen | ZnO (0.1) | Unknown | ND |
| 4 | PG76-22 (PMA) | ZnO (0.2) | Unknown | ND |
| 5 | PG70-22 (PMA) | ZnO (0.2) | Unknown | ND |
| 6 | PG76-22 (PMA) | ZnO (0.2) | Unknown | ND |
| 7 | PG64-22 | MgO (0.1) | 28 | ND |
| 8 | PG64-22 | CuO (0.1) | 28 | ND |

Note:
The PMA samples include 0.2 wt. % ERA, 0.1 wt. % being added initially and then another 0.1 wt. % being added prior to crosslinking.
ND means not detectable.

What is claimed is:

1. A method of modifying asphalt comprising:
   blending asphalt with an emissions reducing additive, the emissions reducing additive comprising a dispersion of from 35 wt. % to about 60 wt. % of a metal oxide in oil to form a modified asphalt, wherein the modified asphalt exhibits reduced sulfur emissions.

2. The method of claim 1, wherein the emissions reducing additive comprises zinc oxide.

3. The method of claim 1, wherein the emissions reducing additive consists of zinc oxide.

4. The method of claim 1, wherein the emissions reducing additive is selected from the group consisting of zinc oxide, copper oxide, iron oxide, aluminum oxide and combinations thereof.

5. The method of claim 1, wherein the emissions reducing additive is a zinc salt.

6. The method of claim 1, wherein the asphalt comprises from about 0.05 wt. % to about 2 wt. % dispersion.

7. The method of claim 1, wherein the dispersion comprises an oil having a flash point of 400° F. or more.

8. The method of claim 1 further comprising blending a surfactant with the dispersion.

9. he method of claim 1, wherein the sulfur emissions are reduced by at least 80%.

10. The method of claim 1, wherein the modified asphalt exhibits hydrogen sulfide emissions of less than 10 ppm.

11. The method of claim 1, wherein the modified asphalt exhibits hydrogen sulfide emissions of less than 1 ppm.

12. A modified asphalt comprising:
asphalt; and
a dispersion of from 35 wt. % wt. % to about 60 wt. % of a metal oxide in oil.

13. The modified asphalt of claim 12, wherein the modified asphalt exhibits hydrogen sulfide emissions of less than 10 ppm.

14. The modified asphalt of claim 12, wherein the modified asphalt exhibits hydrogen sulfide emissions of less than 1 ppm.

15. The modified crude fraction of claim 12, wherein the metal oxide comprises a metal selected from the group consisting of copper, magnesium and zinc.

16. The modified asphalt of claim 12, wherein the modified asphalt comprises less than about 1 wt. % dispersion.

17. The method of claim 1, wherein the dispersion comprises greater than 50 wt. % oil.

* * * * *